United States Patent [19]

Belanger

[11] 4,158,392
[45] Jun. 19, 1979

[54] POCKET PRESS WHEEL

[76] Inventor: Bernard C. Belanger, 10905 E. Burt Rd., Birch Run, Mich. 48415

[21] Appl. No.: 708,489

[22] Filed: Aug. 8, 1977

[51] Int. Cl.² ............................................. A01B 29/04
[52] U.S. Cl. .................................................... 172/548
[58] Field of Search ............... 172/537, 555, 540, 548; 404/221, 224, 222

[56] References Cited

U.S. PATENT DOCUMENTS

| 1,044,404 | 11/1912 | McGill | 172/548 |
|---|---|---|---|
| 1,069,264 | 8/1913 | Keller | 172/548 X |
| 2,146,222 | 2/1939 | Pace | 172/540 |
| 2,228,389 | 1/1941 | Garey | 172/548 |
| 3,922,106 | 11/1975 | Caron | 172/540 |

Primary Examiner—Richard J. Johnson

[57] ABSTRACT

A wheel consisting of cast steel or cast iron having smoothly configured lugs with sufficient weight to press and shape individual pockets in the soil, leaving the ground firm and with a series of individual pockets for the purpose of holding water to prevent water erosion or water run off. Prior art smooth press wheels generally leave continuous grooves in the soil causing water to run to the low areas of the field which leaves little moisture for plants on the higher soil.

1 Claim, 1 Drawing Figure

POCKET PRESS WHEEL

BACKGROUND AND BRIEF SUMMARY

Numerous types of tillage tools or implements have been and are in use for the purpose of farming which leave continuous grooves or furrows in the soil. While others may leave soil smooth as with a roller; this invention is similar to a cultipacker except instead of leaving continuous grooves leaves individual pockets in the soil for the main purpose of holding water.

As a general rule these press wheels have to be larger and heavier than the cultipacker in order to firm the soil and to press in the pockets. The intent is for these wheels to be cast from steel or cast iron (as one casting per press wheel). These cast press wheels as illustrated in the drawing are 27 in. diameter, 6½ in. in width and weigh 145 lbs. Press wheels of these approximate dimensions are considered to be of medium size which are an ideal size to be used with planting, cultivating, or just used as a cultipacker type of implement. Larger press wheels are to be used behind plowing to break up and press down furrows also leaving individual pockets. Other press wheels can be smaller or larger for different purposes. This invention is not of a specific size or weight.

DETAILED DESCRIPTION OF THE INVENTION

In the drawing, six equally spaced lugs are illustrated on the press wheel. My intent is to have alternating press wheels each with four to six equally spaced lugs. When in use as an implement the lugs of each wheel would be positioned between the lugs of the adjacent wheels to eliminate synchronized bounce.

DESCRIPTION OF DRAWING

This is a wheel with a hub as shown at portion 1. Also, spokes 2 are attached to hub 1 which extend outwardly and are secured to cylindrical rim 3. The lugs 4 are designed with a specific configuration so as not to scuff the soil as it leaves the pocket and to hold a maximum of water. Each of the lugs is of generally inverted V-shaped cross section which forms an inverted angle of substantially 90 degrees and has an elongated central outer edge extending circumferentially of the wheel on an arc of a circle centered on the wheel axis. The lateral sides of the lugs terminate closely adjacent to and extend generally parallel to the sides of said rim 3. The opposite ends of said lugs have a convexly curved central edges with the sides of the lugs tapering along said rim to merge with said central edge. The lugs are closely spaced and are approximately six in number. While the invention has been described in conjunction with preferred specific embodiments thereof, it will be understood that this description is intended to illustrate and not limit the scope of the invention, which is defined by the following claims.

Figure 1:
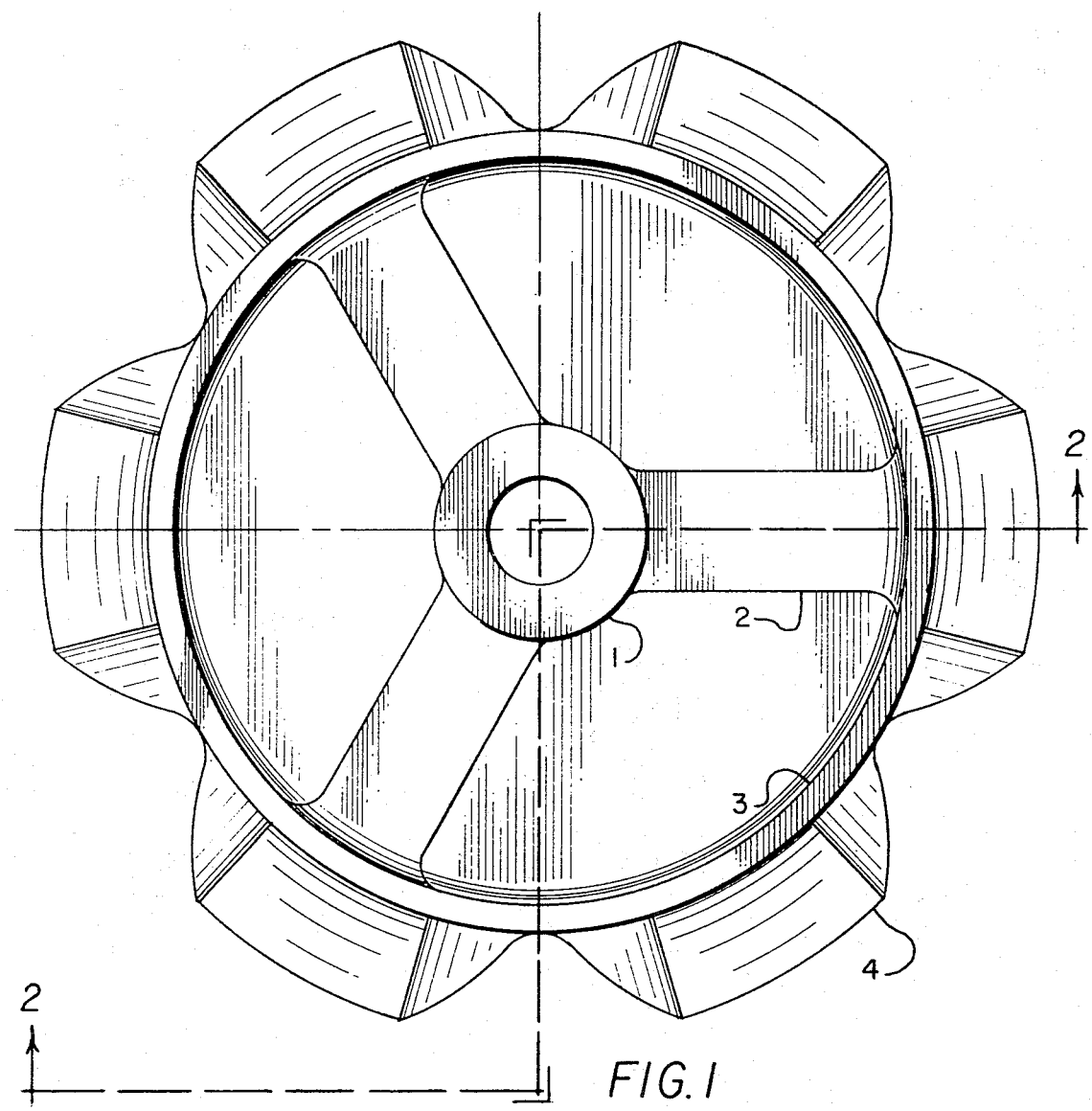
Figure 2:
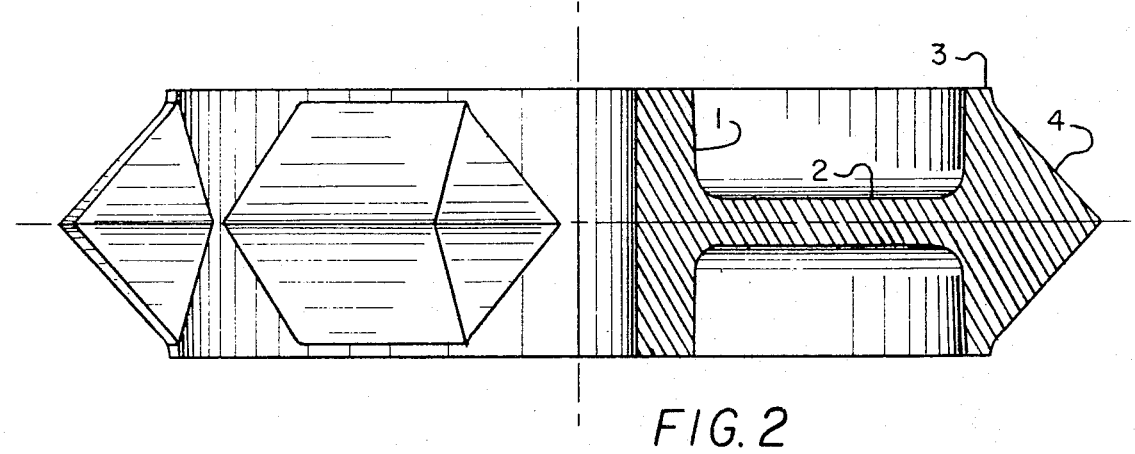

I claim:

1. A press wheel for producing pockets in the soil to collect water runoff, said wheel comprising: a cylindrical rim having a plurality of lugs of generally inverted V-shape cross section, each lug forming an angle of substantially 90 degrees and having an elongated central outer edge extending circumferentially of the wheel on an arc or a circle centered on the wheel axis, the lateral sides of the lugs terminating closely adjacent to and extending generally parallel to the sides of said rim, the opposite ends of said lugs having a convexly curved central edge with the sides of said lugs tapering along said rim to merge with said central edge the lugs being closely spaced and approximately six in number.

* * * * *